United States Patent
Matlin et al.

(10) Patent No.: US 8,397,228 B2
(45) Date of Patent: Mar. 12, 2013

(54) SYSTEMS AND METHODS FOR UPDATING DEVICE SOFTWARE

(75) Inventors: Gabriel Alan Matlin, Evanston, IL (US); Robert F. D'Avello, Lake Zurich, IL (US); Chris Mulderink, Lake Zurich, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 1453 days.

(21) Appl. No.: 11/940,319

(22) Filed: Nov. 14, 2007

(65) Prior Publication Data

US 2009/0125900 A1 May 14, 2009

(51) Int. Cl.
  G06F 9/44 (2006.01)
  G06F 9/445 (2006.01)
(52) U.S. Cl. .......... 717/168; 717/173; 717/174
(58) Field of Classification Search .......... None
  See application file for complete search history.

(56) References Cited

U.S. PATENT DOCUMENTS

| | | | |
|---|---|---|---|
| 6,681,390 B2 | 1/2004 | Fiske | |
| 6,785,707 B2 | 8/2004 | Teeple | |
| 6,832,373 B2 | 12/2004 | O'Neill | |
| 6,941,453 B2 | 9/2005 | Rao | |
| 6,978,453 B2 | 12/2005 | Rao et al. | |
| 6,996,818 B2 | 2/2006 | Jacobi et al. | |
| 7,047,448 B2 | 5/2006 | Rao et al. | |
| 7,082,549 B2 | 7/2006 | Rao et al. | |
| 7,095,336 B2 | 8/2006 | Rodgers et al. | |
| 7,334,005 B2* | 2/2008 | Sobel | 1/1 |
| 7,346,435 B2* | 3/2008 | Amendola et al. | 717/174 |
| 7,366,589 B2* | 4/2008 | Habermas | 717/173 |
| 7,506,309 B2* | 3/2009 | Schaefer | 717/120 |
| 7,983,834 B2* | 7/2011 | Blumendeller | 701/114 |
| 2003/0182599 A1* | 9/2003 | Gray et al. | 714/41 |
| 2004/0078135 A1* | 4/2004 | Kura et al. | 701/114 |
| 2004/0221284 A1* | 11/2004 | Costello et al. | 717/172 |
| 2005/0038581 A1* | 2/2005 | Kapolka et al. | 701/29 |
| 2005/0050538 A1* | 3/2005 | Kawamata et al. | 717/174 |
| 2005/0066236 A1* | 3/2005 | Goeller et al. | 714/39 |
| 2005/0102661 A1* | 5/2005 | De Boer et al. | 717/168 |
| 2005/0216902 A1* | 9/2005 | Schaefer | 717/168 |
| 2005/0216903 A1* | 9/2005 | Schaefer | 717/168 |
| 2005/0256614 A1* | 11/2005 | Habermas | 701/1 |
| 2006/0130046 A1 | 6/2006 | O'Neill | |
| 2006/0155541 A1* | 7/2006 | Tate, Jr. | 704/256.3 |
| 2006/0161314 A1 | 7/2006 | Honmura | |
| 2006/0248172 A1* | 11/2006 | Zurawka et al. | 709/220 |
| 2006/0259207 A1* | 11/2006 | Natsume | 701/1 |
| 2007/0168915 A1* | 7/2007 | Fabbio et al. | 717/101 |
| 2008/0140278 A1* | 6/2008 | Breed | 701/29 |

(Continued)

OTHER PUBLICATIONS

Syed Masud Mahmud, "Secure Software Upload in an Intelligent Vehicle via Wireless Communication Links", 2005 IEEE, pp. 588-593; <http://ieeexplore.ieee.org/stamp/stamp.jsp?tp=&arnumber=1505167>.*

(Continued)

*Primary Examiner* — Thuy Dao
*Assistant Examiner* — Ben C Wang

(57) ABSTRACT

Methods and systems for updating device software are disclosed, including a method for updating an information handling system, the method comprising: receiving an update, wherein the update is identified with an update type selected from a predefined set of update types; determining a probability that the information handling system enters an essential operating state; and installing the update only in response to the probability being less than a threshold probability.

15 Claims, 8 Drawing Sheets

U.S. PATENT DOCUMENTS

| | | | | |
|---|---|---|---|---|
| 2008/0208365 A1* | 8/2008 | Grgic et al. | | 700/2 |
| 2008/0216067 A1* | 9/2008 | Villing | | 717/174 |
| 2009/0013311 A1* | 1/2009 | Ooba et al. | | 717/127 |
| 2009/0043441 A1* | 2/2009 | Breed | | 701/29 |
| 2009/0125897 A1* | 5/2009 | Matlin et al. | | 717/168 |
| 2010/0023207 A1* | 1/2010 | Maeda et al. | | 701/35 |
| 2010/0082559 A1* | 4/2010 | Sumcad et al. | | 717/173 |
| 2010/0265074 A1* | 10/2010 | Namba et al. | | 340/576 |
| 2011/0004513 A1* | 1/2011 | Hoffberg | | 705/14.1 |
| 2011/0130917 A1* | 6/2011 | Genssle et al. | | 701/33 |
| 2011/0307882 A1* | 12/2011 | Shiba | | 717/173 |
| 2012/0124571 A1* | 5/2012 | Nagai et al. | | 717/168 |

OTHER PUBLICATIONS de Boer et al., "Generic Remote Software Update for Vehicle ECUs Using a Telematics Device as a Gateway" 2005 Springer, Advanced Microsystems for Automotive Applications 2005 VDI-Buch, 2005, Part 5, pp. 371-380; <http://www.springerlink.com/content/k0u154m7n6643401/>.*

Duri et al., "Framework for Security and Privacy in Automotive Telematics", 2002 ACM, WM'02, Sep. 28, 2002, Atlanta, Georgia, USA, pp. 25-32; <http://dl.acm.org/citation.cfm?doid=570705.570711>.*

International Search Report and Written Opinion dated Nov. 13, 2008, from corresponding International Patent Application No. PCT/US2008/083355.

International Search Report and Written Opinion dated Nov. 13, 2008, from related International Patent Application No. PCT/US2008/083369.

* cited by examiner

SYSTEMS AND METHODS FOR UPDATING DEVICE SOFTWARE

I. BACKGROUND

The invention relates generally to the field of updating software and more specifically to updating software by receiving remote updates.

II. SUMMARY

In one respect, disclosed is a method for updating an information handling system, the method comprising: receiving an update, wherein the update is identified with an update type selected from a predefined set of update types; determining a probability that the information handling system enters an essential operating state; and installing the update only in response to the probability being less than a threshold probability.

In another respect, disclosed is an information handling system comprising: a processor; memory; and a communications unit, wherein the information handling system is configured to: receive an update, wherein the update is identified with an update type selected from a predefined set of update types; determine a probability that the information handling system enters an essential operating state; and install the update only in response to the probability being less than a threshold probability.

In yet another respect, disclosed is a computer program product stored on a computer operable medium, the computer program product comprising software code being effective to: receive an update, wherein the update is identified with an update type selected from a predefined set of update types; determine a probability that the information handling system enters an essential operating state; and install the update only in response to the probability being less than a threshold probability.

In yet another respect, disclosed is a method for updating an electronic device, the method comprising: providing an update at an information handling system for updating the electronic device; and determining at the information handling system whether the electronic device is in an essential operating state, and in response to determining that the electronic device is not in an essential operating state: the information handling system resetting the electronic device; and the information handling system updating the electronic device.

In yet another respect, disclosed is an information handling system comprising: a processor; memory; and a communications unit, the information handling system being configured to: receive an update for updating an electronic device; and determine whether the electronic device is in an essential operating state, and in response to determining that the electronic device is not in an essential operating state: reset the electronic device; and update the electronic device.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
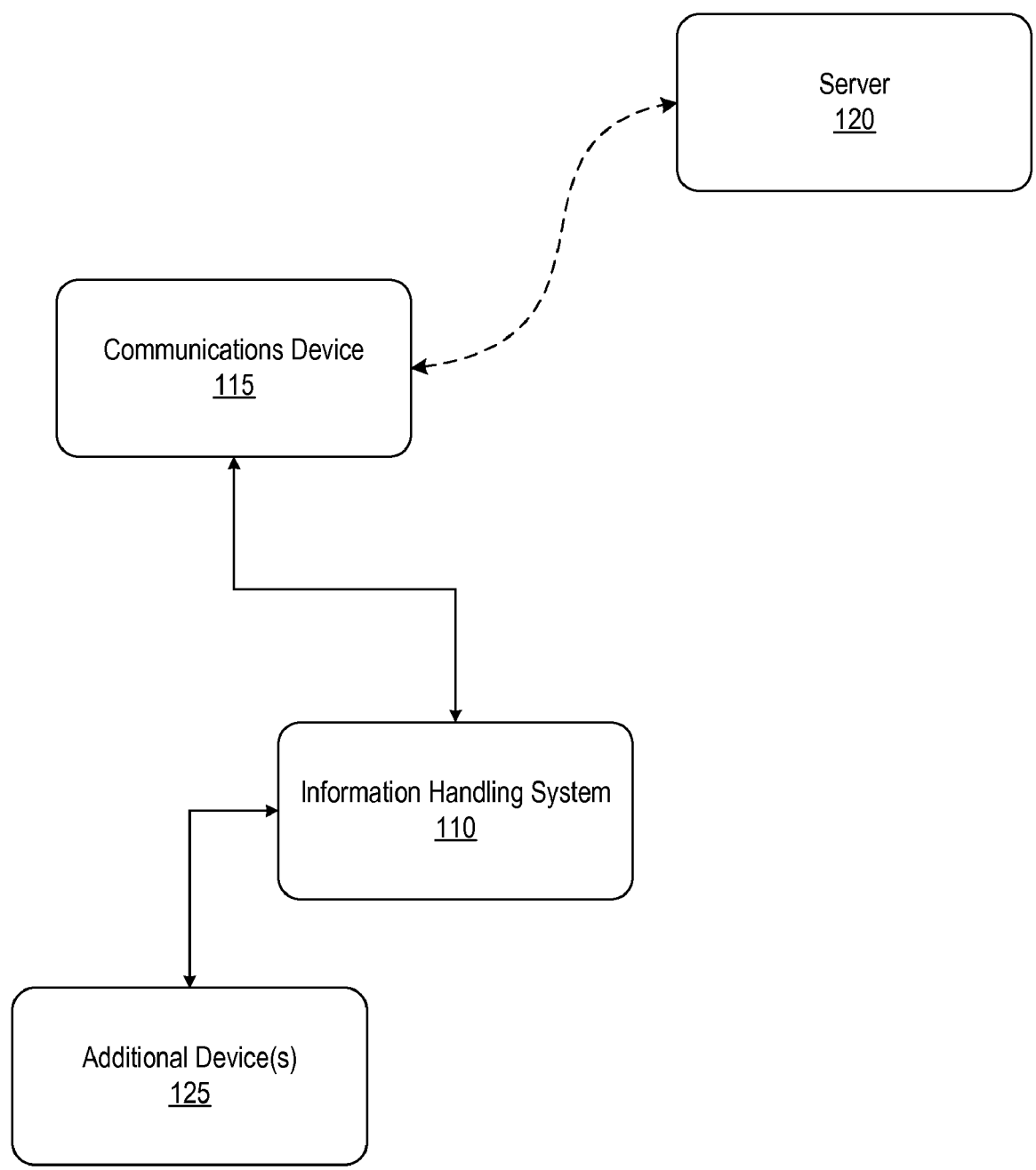
FIG. 1 is a block diagram illustrating a system for performing software updates, in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

FIG. 1 is a block diagram illustrating a system for performing software updates, in accordance with one embodiment.

Information handling system 110 is configured to perform software updates for information handling system 110 and/or for other devices to which information handling system 110 is coupled/has access such as communications device 115 and additional devices 125.

In one embodiment, the updates may be received at information handling system 110 through communications device 115, which may receive the updates from server 120. Communications device 115 may communicate with server 120 over several media/protocols, such as the Internet, Ethernet, local area network ("LAN"), WI-FI®, modem (cellular or landline), cellular data network, satellite, etc. Additional devices 125 represent any devices that may be coupled to information handling system 110, such as input devices, output devices, interface devices, etc.

In one embodiment, information handling system 110 is configured to execute operating software to operate information handling system 110, and in addition, information handling system 110 is configured to update itself as well other devices to which the information handling system 110 is coupled such as communications device 115 and/or additional devices 125.

Figure 3:
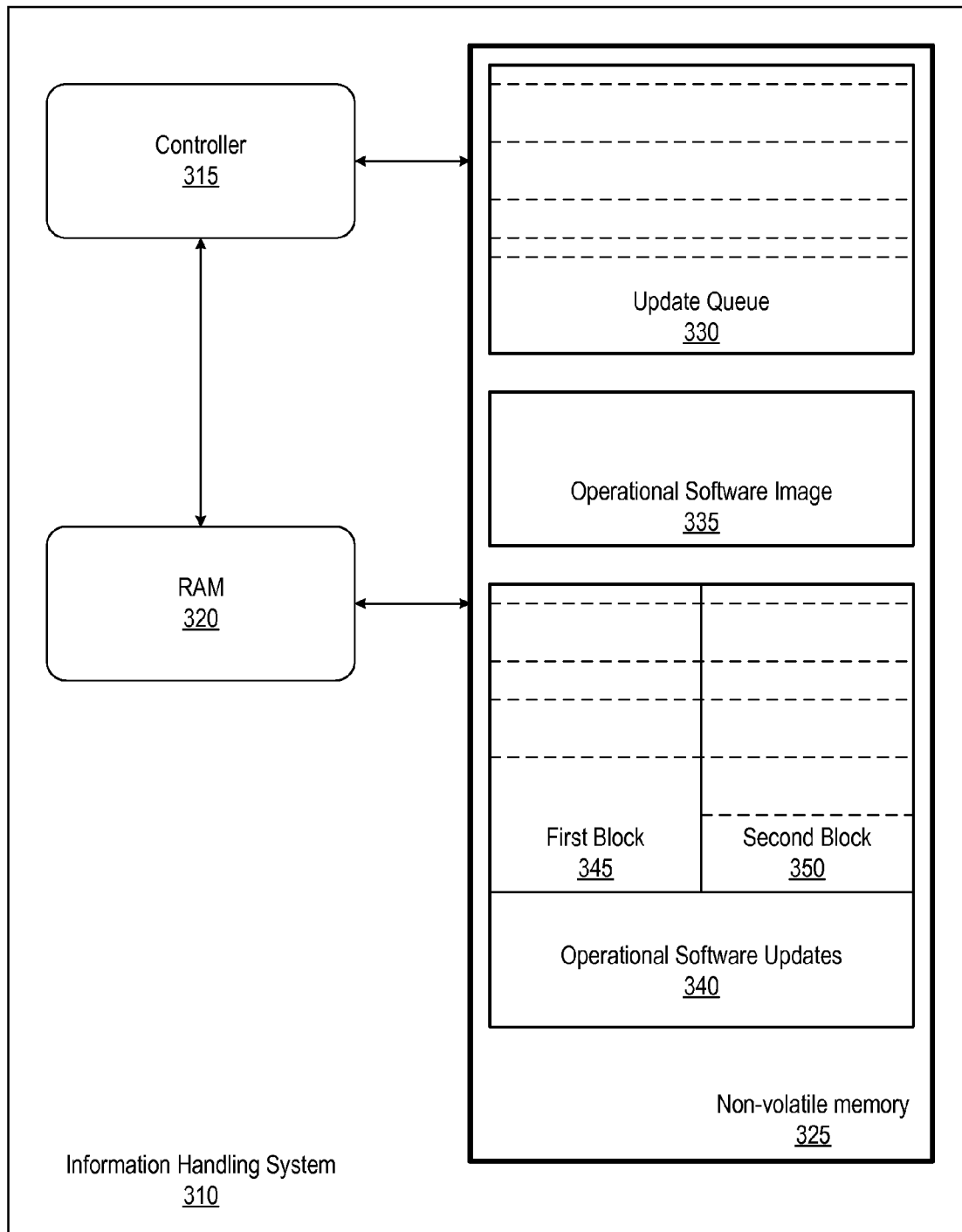
FIG. 3 is a block diagram illustrating an information handling system for performing software updates, in accordance with one embodiment.

One example of the structure of information handling system 110 is described in more detail in FIG. 3.

It should be noted that only one configuration is shown but others are possible. For example, the information handling system and the communications device may be included in the same device, the information handling system and the additional devices may be included in the same device, etc.

Figure 2:
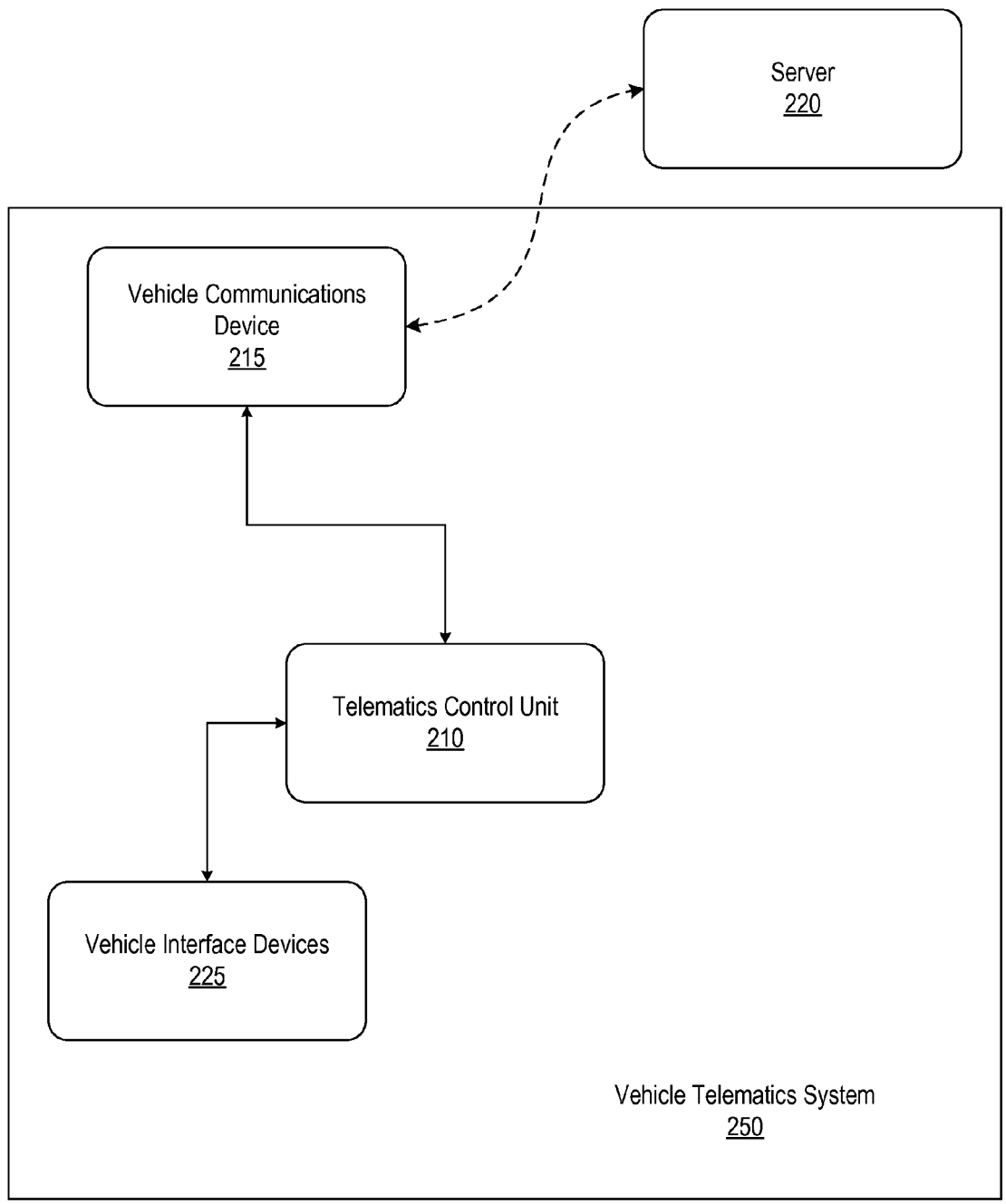
FIG. 2 is a block diagram illustrating a vehicle telematics system for performing software updates, in accordance with one embodiment.

FIG. 2 is a block diagram illustrating a vehicle telematics system for performing software updates, in accordance with one embodiment.

In one embodiment, vehicle telematics system 250 may be comprised in a vehicle in order to facilitate monitoring of the vehicle and the transfer of data to/from the vehicle and a server. The vehicle may include a car, truck, bus, train, aircraft, boat, and the like.

Telematics control unit 210 is configured to perform software updates for telematics control unit 210 and/or for other devices to which telematics control unit 210 is coupled/has access such as vehicle communications device 215 and vehicle interface devices 225. Vehicle interface devices enable vehicle telematics system 250, for example, to interface with the vehicle and to transmit and receive data related to the vehicle's engine status, alarm status, accident status, door lock status, etc.

In one embodiment, the updates may be received at telematics control unit 210 through vehicle communications device 215, which may receive the updates from server 220 through a cellular communications network or other wireless network.

In one embodiment, telematics control unit 210 is configured to execute operating software to operate telematics control unit 210, and in addition, telematics control unit 210 is configured to update itself as well other devices to which the telematics control unit 210 is coupled such as vehicle communications device 215 and/or vehicle interface devices 225.

One example of the structure of telematics control unit 210 is described in more detail in FIG. 3.

It should be noted that only one configuration is shown but others are possible. For example, the telematics control unit and the vehicle communications device may be included in the same device, the telematics control unit and the vehicle interface devices may be included in the same device, etc.

FIG. 3 is a block diagram illustrating an information handling system for performing software updates, in accordance with one embodiment.

Information handling system 310 is configured to perform updates to its own operational software as well as perform software updates for other devices to which information handling system 310 is coupled.

In one embodiment, information handling system 310 comprises controller 315 for processing instructions and data and random access memory ("RAM") 320, which may be used as a working memory. In addition, information handling system 310 may comprise non-volatile memory 325 (which may be flash memory, a hard drive, etc.) for permanently storing software and other data.

In one embodiment, non-volatile memory 325 may be used to store update queue 330. In one embodiment, update queue 330 may be used to store updates that have been received at information handling system 310 but have not yet been applied. These updates may include, among others, updates to the operational software of information handling system 310, updates that may be applied immediately while the operational software is being executed to accomplish a variety of tasks, software updates for other devices to which information handling system 310 may be coupled, etc. Updates may include updates for software or data. In one embodiment, updates may include a comparison section, which may contain information used for authentication and verification of updates.

In one embodiment, update queue 330 may be cleared when all stored updates have been successfully applied or when information handling system 310 receives an instruction to clear update queue 330. In one embodiment, update queue 330 may store information for tracking the number of attempts made to apply each update and the reason, if any, an update is unsuccessful. For example, an update may be unsuccessful if the comparison sections of an update do not match expected values, if an update was interrupted, or if an internal error on information handling system 310 or a device coupled to information handling system 310 prevents successful application.

In one embodiment, non-volatile memory 325 may also be used to store operational software image 335, the software that is loaded and executed to operate information handling system 310. In one embodiment, the operational software in its original form may be loaded and executed each time information handling system 310 is rebooted/reset. To save memory, the operational software image may be stored in a compressed format, in which case the image is uncompressed prior to execution.

In one embodiment, non-volatile memory 325 may also be used to store operational software updates 340. Operational software updates 340 may be a sequence of operational software updates that may be applied to the original operational software each time after a reboot of the system.

In one embodiment, operational software updates 340 may comprise first block 345 and second block 350, one which is active and is used for the application of the operational software updates and one of which is inactive. In one embodiment, when a new operational software update is to be applied, the old operational software updates are copied from the currently active block to the inactive block, the new operational software update is added to the inactive block, and the new updated is verified for successful addition. The inactive block is then made active and the active block is made inactive.

In one embodiment, if no operational software updates have been installed, first block 345 and second block 350 will be initially be inactive. When an operational software update is to be applied, a header may be created that includes a sequence number, a blank field for a signature, and fields containing metadata about the updates that will be stored. The operational software update and metadata are written to one of the blocks. A signature is written to the selected block if the writing of the operational software update and metadata succeeds, and such block is considered active. In one embodiment, the signature is a fixed, 64 bit value. In one embodiment, when a new operational software update is to be applied, a new header may be created with a higher sequence number. The old operational software updates are copied from the currently active block to RAM 320, and the new operational software updates are copied from update queue 330 to RAM 320. The new header and the combined operational software updates stored in RAM 320 are written to the inactive block. If such write succeeds, the signature is written to the inactive block which is then considered active, and the old active block is erased. In one embodiment, if the signature cannot be written to the unsigned inactive block, the unsigned inactive block is erased and the process restarts. In one embodiment, when the new operational software update has been successfully copied to the active block it is marked as installed in update queue 330.

Additional information on the functionality of information handling system 310 is provided in the flowcharts of this document.

Figure 4:
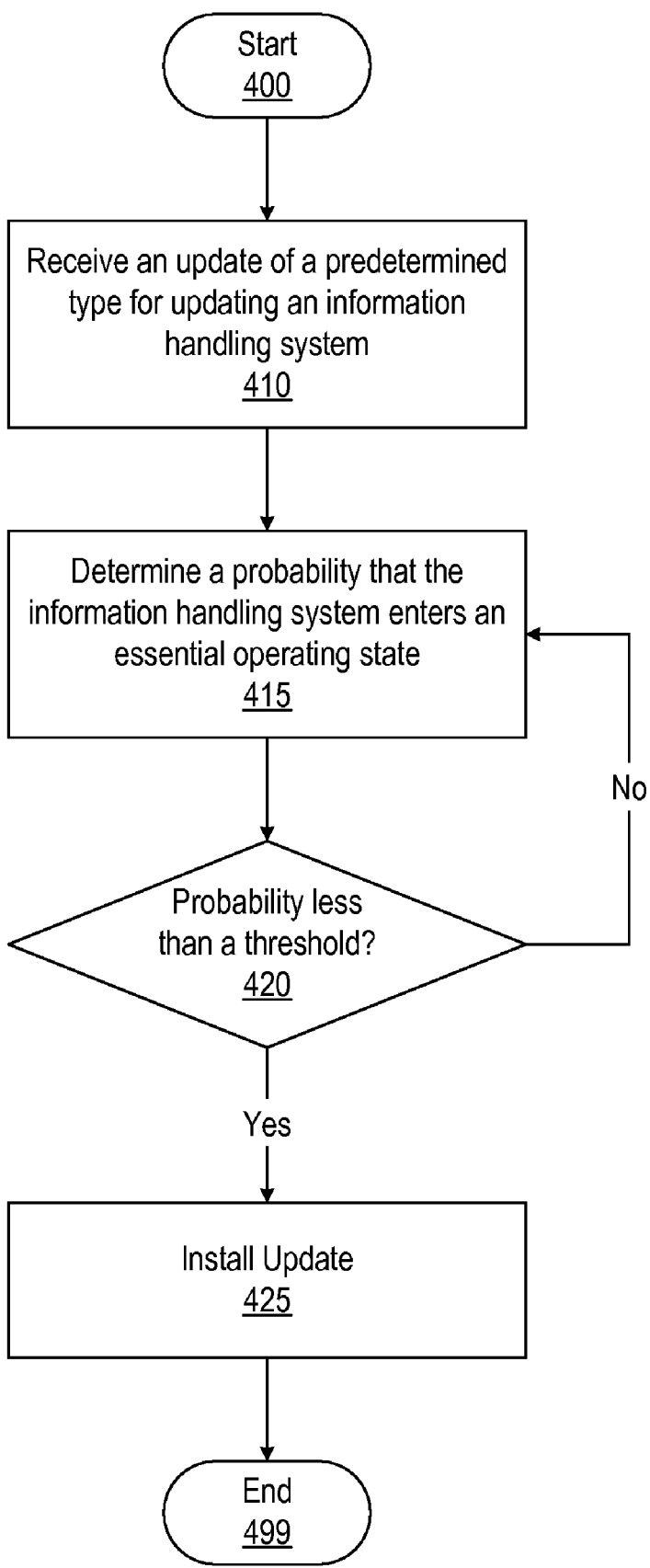
FIG. 4 is a flow diagram illustrating a method for performing software updates in response to determining a probability that a device enters an essential operating state, in accordance with one embodiment.

FIG. 4 is a flow diagram illustrating a method for performing software updates in response to determining a probability that a device enters an essential operating state, in accordance with one embodiment.

Processing begins at 400, whereupon at block 410, an update of a predetermined type is received for updating an information handling system. In one embodiment, the predetermined update types may include, among other types, updates to the operational software of information handling system 310, updates that may be applied immediately while the operational software is being executed to accomplish a variety of tasks, software updates for other devices to which information handling system 310 may be coupled, etc.

In one embodiment, the update may be stored in an update queue with other updates that have not yet been applied. The updates may then be applied in the order the updates were received upon a determination as to the type of each of the updates. In one embodiment, the authenticity of the update may be determined using various known methods prior to storing the update in the update queue.

At block 415, a probability that the information handling system enters an essential operating state is determined. The probability computation may also involve a threshold time over which the probability is computed. The threshold time may be for example, the time within which the information handling system may enter an essential operating state. The threshold time may also depend on the type of each of the updates. In an embodiment where the information handling system is comprised in a vehicle, determining the probability may involve determining whether the key is in the ignition or present in the vehicle, determining whether the vehicle is in a "park" mode, determining whether a vehicular accident is imminent, etc.

An essential operating state may include any operating state such that shutting down or suspending operation of the information handling system or devices coupled to the information handling system could damage or otherwise detrimentally affect or interfere with the normal operation of the information handling system or devices coupled to the information handling system. In one embodiment, an essential operating state may include any state during which the continued operation of the information handling system is required to manage data transmissions from an external source where terminating such transmissions would interfere with the normal operation of the information handling system or devices coupled to the information handling system. In an embodiment where the information handling system is a telematics control unit, an essential operating state may include any state during which incoming and outgoing calls are in progress between a call center and the vehicle in which the telematics control unit is included. For example, if a vehicle is in an accident, the deployment of an airbag may trigger an emergency call via a telematics control unit to a call center. Operation of the telematics control unit during this event is required in order for the emergency call to be made to the call center.

At decision 420, a determination is made as to whether the probability is less than a threshold probability. If the probability is not less than a threshold probability, decision 420 branches to the "no" branch where processing returns to block 415 for the probability to be reassessed until the probability is below the threshold value.

On the other hand, if the probability is less than a threshold probability, decision 420 branches to the "yes" branch where, at block 420, the update is applied. For additional robustness, the updates may be applied using a block-by-block method, for example, with intermediate backups of each block in case of a power loss and a reset of the device.

Processing subsequently ends at 499.

Figure 5:
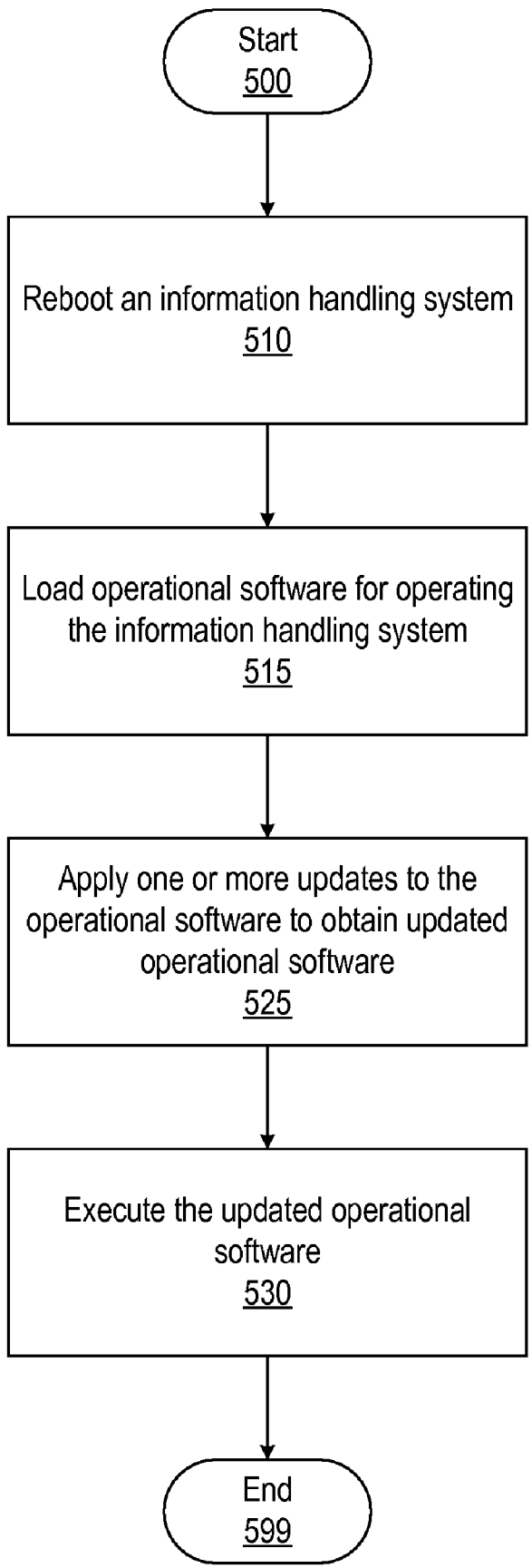
FIG. 5 is a flow diagram illustrating a method for updating operational software for an information handling system, in accordance with one embodiment.

FIG. 5 is a flow diagram illustrating a method for updating operational software for an information handling system, in accordance with one embodiment.

Processing begins at 500 whereupon, at block 510, the information handling system is rebooted. In one embodiment, the information handling system is rebooted every time before applying certain types of software updates such as operational software updates.

At block 515, the operational software for operating the information handling system is loaded. In one embodiment, the operational software is loaded from non-volatile memory (such as flash memory or a hard disk) into working memory such as RAM. In one embodiment, the operational software may be compressed to conserve memory space, in which case, the operational software is also uncompressed.

At block 525, one or more operational software updates are applied to the operational software to obtain updated operational software. In one embodiment, old and new operational software updates are applied to the operational software sequentially to update the operational software At block 530, the updated operational software is executed. Processing subsequently ends at 599.

Figure 6:
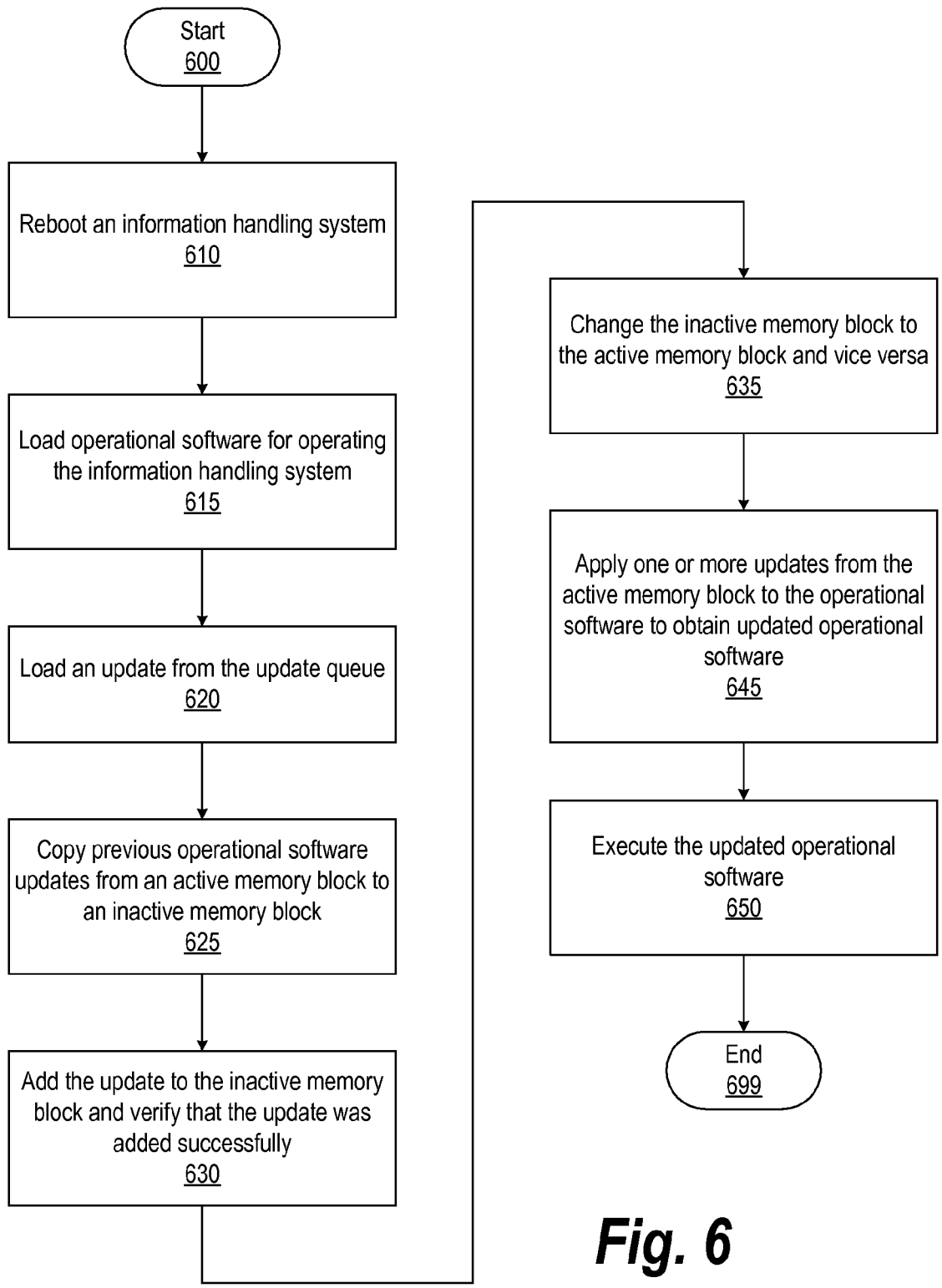
FIG. 6 is a flow diagram illustrating an alternative method for updating operational software for an information handling system, in accordance with one embodiment.

FIG. 6 is a flow diagram illustrating an alternative method for updating operational software for an information handling system, in accordance with one embodiment.

Processing begins at 600, whereupon, at block 610, the information handling system is rebooted. In one embodiment, the information handling system is rebooted every time before applying certain types of software updates such as operational software updates.

At block 615, operational software for operating the information handling system is loaded into RAM. In one embodiment, the operational software is loaded from non-volatile memory (such as flash memory or a hard disk) into working memory such as RAM. In one embodiment, the operational software may be compressed to conserve memory space, in which case, the operational software is also uncompressed.

At block 620, an operational software update is loaded from the update queue. In one embodiment, the update queue may include updates of different types that have not yet been applied. The update queue may be implemented in non-volatile memory to protect the data in the event of power loss.

At block 625, previous operational software updates are copied from an active memory block to an inactive memory block. Two blocks of memory may be maintained with the sequence of operational software updates for robustness, as is described below. In one embodiment, the active memory block maintains the latest sequence of operational software updates that are applied to the operational software each time the information handling system resets/reboots.

At block 630, the operational software update is added to the inactive memory block and then a verification is performed to determine whether the update was added successfully. Accordingly, the inactive memory block now includes all the previous operational software updates (copied from the active memory block) as well as the latest operational software update(s) (copied from the update queue). In one embodiment, the previous operational software updates and the latest operational software updates may be combined in working memory, such as RAM, prior to being written to the inactive memory block.

At block 635, the inactive memory block is changed to the active memory block and the active block is changed to the inactive block. Accordingly, the new active block includes all the previous operational software updates as well as the latest update(s). In the event of a power loss, for example, one of the two blocks will contain all the previous updates; the latest update(s) can be added again from the update queue.

At block 645, one or more updates are applied from the active block, sequentially, to obtain updated operational software. In one embodiment, all the updates in the active memory block are applied each time the information handling system is reset.

At block 650, the updated operational software is executed. Processing subsequently ends at 699.

Figure 7:
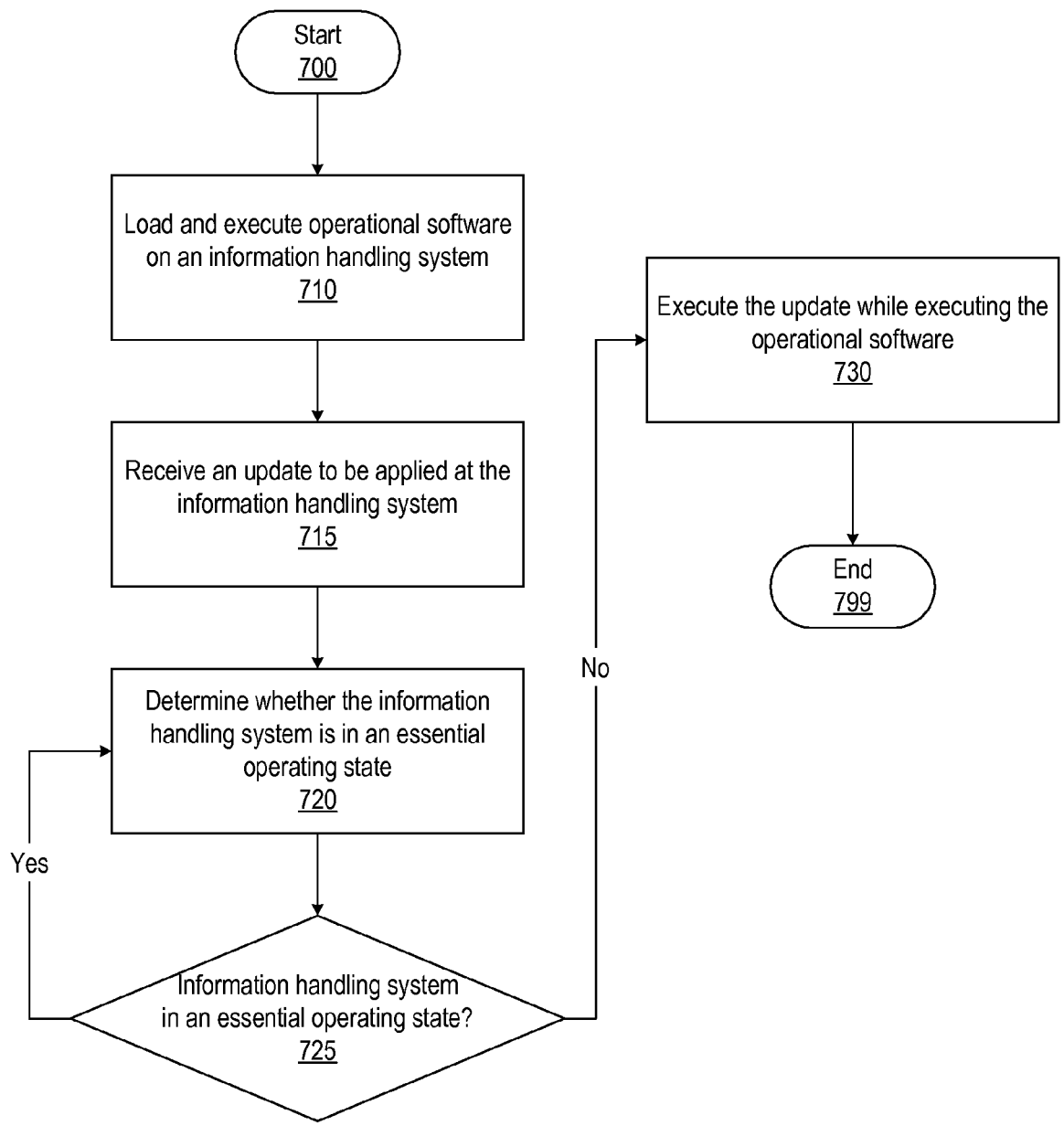
FIG. 7 is a flow diagram illustrating a method for performing immediate updates for an information handling system, in accordance with one embodiment.

FIG. 7 is a flow diagram illustrating a method for performing immediate updates for an information handling system, in accordance with one embodiment.

Processing begins at 700 whereupon, at block 710, operational software is loaded and executed on an information handling system. In one embodiment, an "immediate" update is to be applied here, which is designed to be executed while the operational software for the information handling system is also being executed. Such updates may be utilized to perform computations or modifications that require knowledge of the runtime state of the information handling system or devices coupled to the information handling system.

At block 715, an update is received that is to be applied at the information handling system. In one embodiment, the updates that have not yet been applied may be stored in an update queue and then loaded from the queue in the order that the updates were received.

At block 720, it is determined whether the information handling system is in an essential operating state. In an embodiment where the information handling system is comprised in a vehicle, determining whether the information handling system is in an essential operating state may involve determining whether the key is in the ignition or present in the vehicle, determining whether the vehicle is in a "park" mode, determining whether a vehicular accident is imminent, etc.

A determination is then made, at decision 725, as to whether the information handling system is in an essential operating state. If the information handling system is in an essential operating state, decision 725 branches to the "yes" branch where processing returns to block 720 where the state of the information handling system is again determined.

On the other hand, if the information handling system is not in an essential operating state, the update is executed while the operating software is also being executed. Processing subsequently ends at 799.

Figure 8:
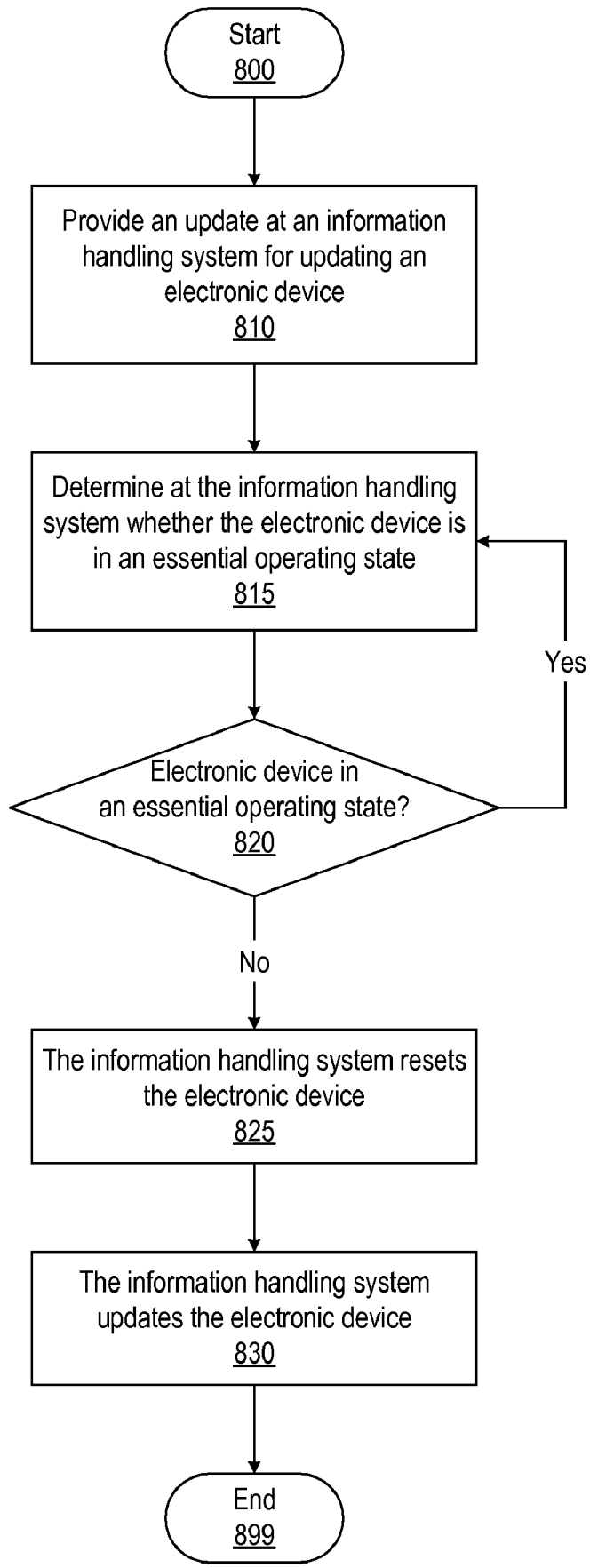
FIG. 8 is a flow diagram illustrating a method for updating an electronic device using an information handling system, in accordance with one embodiment.

FIG. 8 is a flow diagram illustrating a method for updating an electronic device using an information handling system, in accordance with one embodiment.

Processing begins at 800 whereupon, at block 810, an update is provided at an information handling system for updating an electronic device to which the information handling system has access. The electronic device can be any device to which the information handling system is coupled and/or to which the information handling system has access. In one embodiment, for example, the electronic device may be a communications device that enables the information handling system to communicate with other remote devices such as servers, etc.

At block 815, the information handling system determines whether the electronic device is in an essential operating state. In an embodiment where the information handling system and the electronic device are comprised in a vehicle, determining whether the devices are in an essential operating state may involve determining whether the key is in the ignition or present in the vehicle, determining whether the vehicle is in a "park" mode, determining whether a vehicular accident is imminent, etc.

At decision 820, a determination is made as to whether the electronic device is in an essential operating state. If the device is an essential operational state, decision 820 branches to the "yes" branch where processing returns to block 815 for the state of the electronic device to reassessed.

On the other hand, if the electronic device is not in an essential operating state, decision 820 branches to the "no" branch where, at block 825, the information handling system resets the electronic device.

At block 830, the information handling system updates the electronic device. In one embodiment, the information handling system may update the electronic device by transferring the update to the electronic device from the update queue.

In one embodiment, the information handling system may update the electronic device block-by-block in order to avoid data loss in the event of a power loss. The information handling system, for example, may load a block of memory from the device, backup the block, update the block, and then replace the block at the device with the updated block. By keeping a record of this procedure, a certain block may be updated again in the event of power loss, and the update procedure may continue from that point.

Processing subsequently ends at 899.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for updating an information handling system for a vehicle, the method comprising:
   receiving, via a communications device of the information handling system, an update, wherein the update is identified with an update type selected from a predefined set of update types;
   determining a probability that the information handling system enters an essential operating state in less than a threshold time period, the threshold time period being determined in response to at least one of: whether a vehicle ignition key is in an ignition switch or present in the vehicle, whether the vehicle is in a "park" mode, and whether a vehicular accident is imminent, an essential operating state being a state wherein interrupting operation of the information handling system will interrupt an in-progress call between a telematics unit with the vehicle and a call center; and
   installing the update only in response to the probability being less than a threshold probability.

2. The method of claim 1, wherein the installing further comprises installing the update in response to determining the update type of the update.

3. The method of claim 1, further comprising storing the update in an update queue and validating the update to determine an authenticity of the update prior to the installing.

4. An information handling system for a vehicle comprising:
   a processor;
   memory; and
   a communications unit,
   wherein the information handling system is configured to:
      receive an update, wherein the update is identified with an update type selected from a predefined set of update types;
      determine a probability that the information handling system enters an essential operating state in less than a threshold time period, the threshold time period being determined in response to at least one of: whether a key is in an ignition switch for the vehicle or is present in the vehicle, whether the vehicle is in a "park" mode, and whether a vehicular accident is imminent, an essential operating state being a state wherein interrupting operation of the information handling system will interrupt an in-progress call between a telematics unit with the vehicle and a call center; and
      install the update only in response to the probability being less than a threshold probability.

5. The information handling system of claim 4, wherein the information handling system is further configured to install the update in response to determining the type of update.

6. The information handling system of claim 4, being further configured to store the update in an update queue and to validate the update to determine an authenticity of the update.

7. A computer program product stored on a non-transitory computer operable medium, the computer program product comprising software code comprising an information handling system for a vehicle, the software code being effective to:
   receive an update, wherein the update is identified with an update type selected from a predefined set of update types;
   determine a probability that the information handling system enters an essential operating state, in less than a threshold time period, the threshold time period being determined in response to at least one of: whether a vehicle ignition key is in an ignition switch or present in the vehicle, whether the vehicle is in a "park" mode, and whether a vehicular accident is imminent, an essential operating state being a state wherein interrupting operation of the information handling system will interrupt an in-progress call between a telematics unit with the vehicle and a call center; and
   install the update only in response to the probability being less than a threshold probability.

8. The product of claim 7, wherein the code is further effective to:
   install the update in response to determining a type of update.

9. The product of claim 7, wherein the code is further effective to store the update in an update queue and to validate the update to determine an authenticity of the update.

10. A method for updating an electronic device having memory comprised of first and second memory blocks, one of the first and second memory blocks being active, the other being inactive, the method comprising:
    providing, via a communications device of an information handling system, an update at the information handling system for updating the memory of the electronic device; and
    determining a probability at the information handling system whether the electronic device is in an essential operating state, for a threshold time period, the threshold time period being determined in response to at least one of: whether a vehicle ignition key is in an ignition switch or present in the vehicle, whether the vehicle is in a "park" mode, and whether a vehicular accident is imminent, an essential operating state being a state wherein interrupting operation of the information handling system will interrupt an in-progress call between a telematics unit and a call center; and
    in response to determining that the probability that the electronic device is not in an essential operating state is below a threshold value:
    resetting the electronic device; and
    updating the inactive memory of the electronic device; and
    changing the inactive memory to an active memory.

11. The method of claim 10, wherein the updating occurs only when the electronic device is reset.

12. The method of claim 10, wherein the updating comprises:
    loading a block of memory to be updated from the electronic device;
    comparing the block of memory to a corresponding memory block from the update;
    updating the loaded block of memory using the corresponding memory block from the update;
    replacing the block of memory with the updated loaded block of memory; and
    deleting the loaded memory block in response to the replacing being completed.

13. An information handling system comprising:
    a processor;
    memory; and
    a communications unit, the information handling system being configured to:

receive an update for updating an electronic device having first and second memory blocks; and determine a probability of whether the electronic device is in an essential operating state, for less than a threshold time period, the threshold time period being determined in response to at least one of: whether a vehicle ignition key is in an ignition switch or present in the vehicle, whether the vehicle is in a "park" mode, and whether a vehicular accident is imminent, an essential operating state being a state wherein interrupting operation of the information handling system will interrupt an in-progress call between a telematics unit and a call center; and in response to determining that the electronic device is not in an essential operating state:

reset the electronic device; and sequentially update the memory blocks by updating the second memory block after updating the first memory block of the electronic device.

14. The information handling system of claim 13, being configured to update the electronic device only when the electronic device is reset.

15. The information handling system of claim 13, the information handling system being further configured to:

load a block of memory to be updated from the electronic device;

compare the block of memory to a corresponding memory block from the update;

update the loaded block of memory using the corresponding memory block from the update;

replace the block of memory with the updated loaded block of memory; and delete the loaded memory block in response to the replacing being completed.

\* \* \* \* \*